March 23, 1954
R. A. WOLF ET AL
2,672,726
DUCTED FAN JET AIRCRAFT ENGINE
Filed Sept. 19, 1950
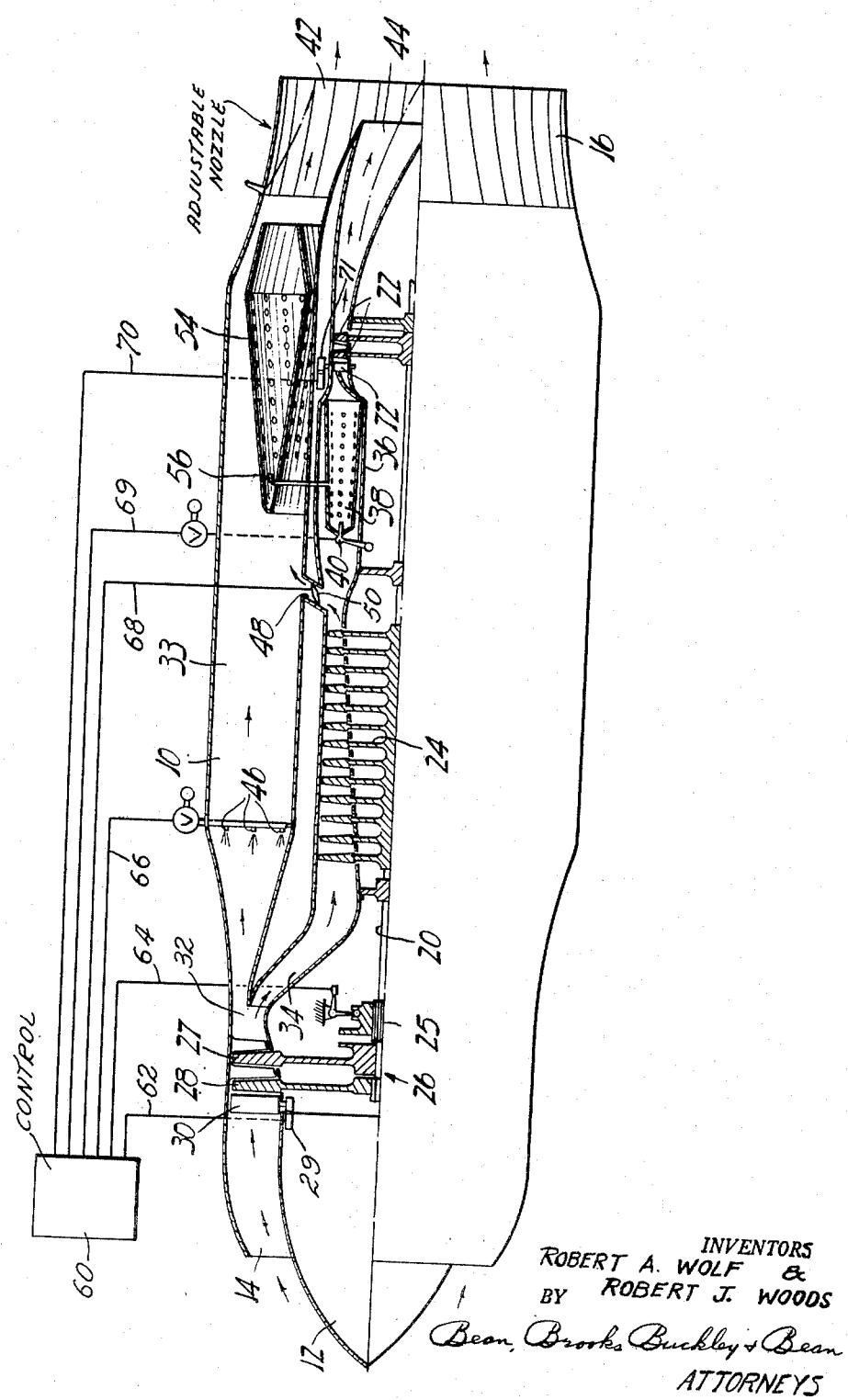
INVENTORS
ROBERT A. WOLF
&
BY ROBERT J. WOODS
Bean, Brooks Buckley & Bean
ATTORNEYS Patented Mar. 23, 1954

2,672,726

UNITED STATES PATENT OFFICE 2,672,726

DUCTED FAN JET AIRCRAFT ENGINE

Robert A. Wolf, South Wales, and Robert J. Woods, Grand Island, N. Y., assignors to Bell Aircraft Corporation, Wheatfield, N. Y.

Application September 19, 1950, Serial No. 185,667

6 Claims. (Cl. 60—35.6)

This invention relates to aircraft engines, and more particularly to an improved engine of the jet type.

Whereas, the supercharged ram-jet type engine has been developed to a very satisfactory degree for high power output it is notoriously unsuited for economical operation under low speed, low altitude conditions of flight, and is relatively economical in specific fuel consumption only under high speed high power conditions. Consequently, aircraft powered by such engines are only suitable for operations requiring relatively short radii of action, and can have no substantial reserve fuel supplies such as for example to permit a returning aircraft to linger over a home base pending clearing of landing traffic, or the like. However, modern requirements in military fighter aircraft, for example, indicate the need for flight and combat with enemy aircraft at both high and low altitudes, along with ability to take off in short distances and to climb rapidly to altitude. Furthermore, such aircraft may be called upon to exhibit high flight speed at high altitudes, and to engage in combat at maximum power for substantial periods of time. Then, in order to successfully return to base such aircraft should be able to cruise economically after breaking contact with the enemy and loiter if necessary over the return base for substantial periods of time at low altitudes while awaiting landing opportunities.

Thus, it is indicated that the ideal military airplane for such purposes as set forth hereinabove would comprise essentially a multi-speed airplane with a high and low power and speed range engine. Some prior efforts along the line of providing dual range aircraft engines have included unit arrangements of dual engines connected through a common reduction gearing to a single propeller, with a view to operating the aircraft by only one of the engines under low power requirements for reduced fuel consumption, and by both engines when maximum power is required. However, such arrangements are inefficient under low power conditions because one engine is then dead and involves a heavy drag loss. Also the use of dual engines undesirably complicates the mechanics of the aircraft arrangement.

The present invention contemplates utilization and modification of a presently available type engine of the style now known as a turbo-jet engine; such modification thereof resulting in conversion to a ducted fan jet engine type operable when desired in a substantially increased power output and speed range or in a substantially reduced power output and speed range. Thus, the invention contemplates a single engine which may be readily constructed by simply modifying a presently available engine to provide in effect a novel variable range engine capable of efficient operation under different speed and power conditions to meet the tactical requirements such as set forth hereinabove.

In the drawing, the figure is a schematic longitudinal sectional view through an engine of the invention.

As shown in the drawing, the engine is basically of the ducted fan jet type comprising an outer casing or cowling 10 which in conjunction with a reduced diameter nose cowling 12 provides an annular air inlet 14. At its rear end the cowling 10 is provided with adjustable shutter type jet nozzle arrangements as indicated at 16 for various jet nozzle effects, as will be explained more fully hereinafter. A power shaft 20 is rotatably mounted on the longitudinal axis of the engine and mounts adjacent its rear end turbine blades as are indicated at 22 which derive power from turbine combustion chambers for driving the shaft 20 as will be explained more fully hereinafter. Intermediate of its length the shaft 20 carries a multi-stage compressor unit 24 comprising a series of blades as indicated in the drawing, and at the front end the shaft 20 is arranged for adjustable connection through a variable drive arrangement 25 to one stage 27 of a multi-stage axial fan unit 26, the fan 28 being keyed to shaft 20. The variable drive arrangement 25 might include a clutch and/or gear shift device, as preferred; so that the stage 27 may be selectively controlled. Adjustable inlet guides or vanes as indicated at 30 are arranged within the air inlet 14 ahead of the position of the axial fan blades so as to regulate the mass of air flow through the fan unit according to the engine power control schedule.

The air inlet duct aft of the position of the axial fan is divided as indicated at 32 into an outer duct 33 and an inner duct 34 which conveys a portion of the air delivered by the fan 26 to the compressor 24 which thereupon operates to compress the air prior to delivery thereof into a series of primary turbine combustion chambers 36 which are grouped radially about the power shaft 20 in the region of the turbine 22. The turbine combustion chambers enclose perforated wall spaces 38 to provide burner spaces into which are directed fuel atomizer nozzles as indicated at 40 and suitable ignitor means. Thus, the air delivered from the compressor 24 to the combustion chambers 36 is therein mingled with fuel from the nozzles 40 and burned to produce a blast of combustion gases which passes through the turbine blades 22 for driving the latter to furnish power to the shaft 20 for the purposes referred to hereinabove. As is customary in the standard ducted fan engine arrangement previously referred to, that portion of the air delivered by the fan blades 27—28 which enters the duct 33 passes therethrough and thence out through an annular exhaust nozzle 42 to augment the thrust effect of the hot gases issuing from the turbine exhaust nozzle 44.

However, in accord with the present invention fuel nozzles as indicated at 46 are disposed for selective discharge within the air duct 33 to disperse fuel into the air passing therethrough, and a plurality of bleed-off passageways are provided as indicated at 48 to permit passage of a portion of the air discharged from the compressor 24 into the duct 33; the passageways 48 being controlled by valves 50. Flame holders and auxiliary combustion chambers 54 are disposed in the duct 33 aft of the passageways 48 to insure complete combustion of the fuel dispersed from the nozzles 46; and a torch type ignitor 56 controlled by suitable valve means 74 as illustrated is provided for passage of flaming gas from the spaces 38 to cause ignition of the fuel mixture in the outer combustion chamber. Thus, the products of combustion issuing from the combustion chambers 54 will be directed to issue through the exhaust nozzle 42; and it will therefore be appreciated that whenever the engine is adjusted for delivery of fuel through the nozzles 46 the power output capacity of the engine will be greatly increased.

The control system for the engine will preferably include a suitable central control station as schematically indicated at 60 from which extend various control elements to the various controlled parts of the engine. An operating rod 62 operates for example a rack and pinion drive 29 to control the inlet guide vanes 30. A linkage 64 operates the clutch and/or the gear shift mechanism 25 to selectively control the stage 27. The element 66 controls the valves in the fuel line to vary the feed to the nozzles 46. A linkage 68 pivots the by-pass valves 50 to control the openings of the by-pass to allow some of the air from the compressor 24 to the duct 33 to mix with the air and fuel in the combustion chambers 54. The element 69 leading from the central control station 60 controls the valves in the fuel lines to the nozzles 40 to control the amount of fuel fed into the combustion chambers 36. The operating rod 70 operates for example a rack and pinion drive 71 to control the adjustable vanes 72 disposed ahead of the turbine blades 22, for regulation of admission of combustion gases to the turbine.

To provide for efficient operation of the engine at reduced thrust, the auxiliary fuel nozzles 46 are closed; operation of the combustion spaces 38 is reduced as by throttling the flow of the fuel to the nozzles, the compressed air "bleed-off" valves 50 are opened; and the clutch and/or gear shift mechanism 25 is actuated so as to disengage the stage 27 of the multi-stage fan unit 26 from the shaft 20 thereby allowing the fan unit to operate at reduced capacity. Under such conditions the vanes 72 are adjusted toward closed positions so as to reduce the volume of gas flow through the turbine; thereby permitting the turbine to operate at normal efficiency, speed and pressure. Under such conditions the by passes 48 are opened to permit the excess air from the compressor to pass out of the jet nozzle 42, and the engine thereupon operates efficiently under reduced thrust conditions.

To provide for maximum thrust output, the valves to the fuel nozzles 46 are opened; all of the valves to the fuel nozzles 40 are opened; the valves 50 are closed; the clutch and/or gear shift mechanism is shifted to couple the stage 27 to the shaft 20 to obtain maximum capacity; and the turbine vanes 72 are moved to full opened position to obtain maximum output. The ignitor 56 thereupon ignites the fuel from the nozzles 46 in the combustion chamber 54, and the engine operates at maximum power as an efficient supercharged jet engine.

Thus, it will be appreciated that an efficient multi-range aircraft engine is provided through modification of a presently available single range engine design without overall enlargement or other undesirable complication thereof; and it will of course be appreciated that whereas only one form of the invention has been shown and described in detail it will be apparent to those skilled in the art that the invention is not so limited but that various changes may be made therein without departing from the spirit of the invention or the scope of the appended claims.

What is claimed is:

1. A jet propulsion engine structure for aircraft and the like comprising an outer cowling, a rotatable shaft, stationary casing means in said cowling defining outer and inner ducts enclosing said shaft in spaced concentric relation and intercommunicating at their forward ends, means defining an air inlet opening at the forward end of said structure communicating with said ducts, means defining a first discharge nozzle at the rear end of said structure, a compressor disposed to compress air flowing through said inner duct and carried by said shaft to rotate therewith, a plurality of primary fuel combustion devices within said inner duct, a turbine keyed to said shaft and positioned to drive the latter in response to flow of motive fluid from said primary combustion devices for driving said compressor, means defining a second discharge nozzle at the rear end of said engine structure for receiving the turbine exhaust therethrough, a variable capacity fan mounted to operate within said air inlet opening, means interconnecting said shaft and said fan and adjustable to drive said fan at different capacities from said shaft, auxiliary combustion devices disposed within said outer duct between said fan and said first discharge nozzle, fuel nozzles arranged to discharge fuel into said outer duct between said fan and said auxiliary combustion devices, bypass port means between said inner and outer ducts at a position behind said compressor and ahead of said auxiliary combustion devices, means for selective supply of fuel to said primary combustion devices and to said fuel inlet nozzles, and control means actuatable to close said bypass port means and to energize said auxiliary combustion devices and to adjust said primary combustion devices and said fuel inlet nozzles to maximum operation and to adjust said fan control means to high capacity fan operation for increased power output, said control means being also actuatable to open said bypass port means and deenergize said auxiliary combustion devices and throttle said primary combustion devices and said fuel inlet nozzles to provide for reduced capacity fan operation for decreased power output.

2. A jet propulsion engine structure for aircraft and the like comprising a rotatable shaft, stationary casing means enclosing said shaft in spaced concentric relation thereby defining inner and outer annular passageways intercommunicating at their forward ends and each communicating with an air inlet opening at the front end of said engine structure and concentric inner and outer discharge nozzles at the rear end of said structure communicating with the respective passageways, a compressor disposed to compress air flowing through said inner passageway and carried by said shaft to rotate therewith, a plurality of primary fuel combustion devices within said inner passageway, a turbine keyed to said shaft and positioned to drive the latter in response to flow of motive fluid from said primary combustion devices for driving said compressor, said turbine being arranged to exhaust directly through said inner discharge nozzle, a variable capacity fan mounted to operate within said air inlet opening, air inlet control vanes disposed ahead of said fan, means interconnecting said shaft and said fan and adjustable to drive said fan at different capacities from said shaft, auxiliary combustion devices disposed within said outer annular passageway behind said fan, fuel inlet nozzles arranged to discharge fuel into said outer annular passageway between said fan and said auxiliary combustion devices, bypass port means between said inner and outer passageways at a position behind said compressor and ahead of said auxiliary combustion devices, means for selective supply of fuel to said primary combustion devices and to said fuel inlet nozzles, and control means actuatable to close said bypass port means and to energize said auxiliary devices and to adjust said primary combustion devices and said fuel inlet nozzles to maximum operation and to adjust said fan to high capacity fan operation an said vanes toward wide open position, said control means being also actuatable to open said bypass port means and deenergize said auxiliary combustion devices and throttle said primary combustion devices and said fuel inlet nozzles to reduced operation and to adjust said fan to provide for reduced capacity fan operation and to adjust said vanes toward closed position.

3. A jet propulsion engine structure for aircraft and the like comprising a rotatable shaft, outer and inner stationary casings enclosing said shaft in spaced concentric relation thereby defining outer and inner annular passageways communicating at their forward ends with an air inlet opening at the front end of said structure and at their rear ends with concentric discharge nozzles at the rear end of said structure, a compressor disposed to compress air flowing through said inner passageway and carried by said shaft to rotate therewith, a plurality of primary fuel combustion devices within said inner passageway, a turbine keyed to said shaft and positioned to drive the latter in response to flow of motive fluid from said primary combustion devices for driving said compressor, control vanes disposed between said primary combustion devices and said turbine, said turbine being adapted to exhaust directly through the inner of said discharge nozzles, a variable capacity fan mounted to operate within said inlet opening, means interconnecting said shaft and said fan and adjustable to drive said fan at different capacities from said shaft, auxiliary combustion devices disposed within said outer annular passageway behind said fan, fuel inlet nozzles arranged to discharge fuel into said outer annular passageway between said fan and said auxiliary combustion devices, bypass port means through said inner casing at a position behind said compressor and ahead of said auxiliary combustion devices, means for selective supply of fuel to said primary combustion devices and to said fuel inlet nozzles, and control means actuatable to close said bypass port means and to energize said auxiliary combustion devices and to adjust said primary combustion devices and said fuel inlet nozzles and said vanes to maximum operation and to adjust said fan to high capacity fan operation, said control means being also actuatable to open said bypass port means and deenergize said auxiliary combustion devices and throttle said primary combustion devices and said fuel inlet nozzles and said vanes to reduced operation and to adjust said fan to provide for reduced capacity fan operation.

4. A jet propulsion engine structure for aircraft and the like comprising a rotatable shaft, outer and inner stationary casings enclosing said shaft in spaced concentric relation thereby defining outer and inner annular passageways intercommunicating at their front ends and communicating with an air inlet opening at the front end of said structure and with outer and inner discharge nozzles respectively at the rear end of said structure, a compressor disposed to compress fluid flowing through said inner passageway, a turbine keyed to said shaft and positioned to drive the latter in response to flow of motive fluid from said primary combustion devices for driving said compressor, said turbine being adapted to exhaust directly through said inner discharge nozzle, a variable capacity fan mounted to operate within said inlet opening, means interconnecting said shaft and said fan and adjustable to drive said fan at different capacities from said shaft, auxiliary combustion devices disposed within said outer annular passageway behind said fan, fuel inlet nozzles arranged to discharge in said outer annular passageway between said fan and said auxiliary combustion devices, bypass port means through said inner casing at a position behind said compressor and ahead of said auxiliary combustion devices, means for selective supply of fuel to said primary combustion devices and to said fuel inlet nozzles, and control means actuatable to adjust said bypass port means and said auxiliary combustion devices and said primary combustion devices and said fuel inlet nozzles and said fan drive means.

5. A jet propulsion engine structure for aircraft and the like comprising a rotatable shaft, outer and inner stationary casings enclosing said shaft in spaced concentric relation thereby defining outer and inner annular passageways intercommunicating at their front ends to define a throat communicating with an air inlet opening at the front end of said structure, said passageways communicating with outer and inner discharge nozzles at the rear end of said structure, a compressor disposed to compress fluid in said inner passageway and carried by said shaft to rotate therewith, a plurality of primary fuel combustion devices within said inner passageway disposed to receive fluid from said compressor, a turbine keyed to said shaft and positioned to drive the latter in response to flow of motive fluid from said primary combustion devices for driving said compressor, said turbine being adapted to exhaust directly through said inner discharge nozzle, a variable capacity fan mounted within said throat adjacent said inlet opening, means interconnecting said shaft and said fan adjustable to drive said fan at different capacities from said shaft, auxiliary combustion devices disposed within said outer annular passageway behind said fan, fuel inlet nozzles arranged to discharge in said outer annular passageway between said fan and said auxiliary combustion devices, bypass port means through said inner casing at a position behind said compressor and ahead of said auxiliary combustion devices, and means for selective control of supply of fuel to said primary combustion devices and said fuel inlet nozzles and control of said auxiliary combustion devices and said bypass port means and said fan drive means.

6. A jet propulsion engine structure for aircraft and the like comprising a rotatable shaft, outer and inner generally cylindrical stationary casings enclosing said shaft in spaced relation thereby defining outer and inner annular passageways having a common throat communicating with an air inlet opening at the front end of said structure, said passageways communicating with individual concentric discharge nozzles at the rear end of said structure, a compressor comprising hub means carried by said shaft to rotate therewith and air displacement blades extending into said inner passageway, a plurality of primary fuel combustion devices within said inner passageway disposed to receive air from said compressor, a turbine having hub means keyed to said shaft to drive the latter and blade means extending into said inner passageway to be driven in response to flow of motive fluid from said primary combustion devices for driving said shaft and said compressor, said turbine being adapted to exhaust directly through the inner of said discharge nozzles, a variable capacity fan carried by said shaft and having blade means extending into said throat adjacent said air inlet opening, means interconnecting said shaft and said fan and adjustable to drive said fan at different capacities from said shaft, auxiliary combustion devices disposed within said outer passageway behind said fan, fuel inlet nozzles arranged to discharge in said outer passageway between said fan and said auxiliary combustion devices, bypass port means connecting said outer and inner passageways at a position behind said compressor and ahead of said auxiliary combustion devices, and means for selective control of supply of fuel to said primary combustion devices and said fuel inlet nozzles and control of said bypass port means and said fan drive means.

ROBERT A. WOLF.
ROBERT J. WOODS.

References Cited in the file of this patent

UNITED STATES PATENTS

| Number | Name | Date |
| --- | --- | --- |
| 2,464,724 | Sédille | Mar. 15, 1949 |
| 2,503,006 | Stalker | Apr. 4, 1950 |
| 2,504,181 | Constant | Apr. 18, 1950 |
| 2,548,975 | Hawthorne | Apr. 17, 1951 |
| 2,589,548 | Imbert | Mar. 18, 1952 |

FOREIGN PATENTS

| Number | Country | Date |
| --- | --- | --- |
| 243,957 | Switzerland | Feb. 17, 1947 |